United States Patent
Ahmed et al.

(10) Patent No.: US 10,919,532 B2
(45) Date of Patent: Feb. 16, 2021

(54) APPARATUS AND METHOD FOR LONGITUDINAL CONTROL IN AUTOMATIC LANE CHANGE IN AN ASSISTED DRIVING VEHICLE

(71) Applicant: GM GLOBAL TECHNOLOGY OPERATIONS LLC, Detroit, MI (US)

(72) Inventors: Sami Ahmed, Orion Township, MI (US); Kevin A. O'Dea, Ann Arbor, MI (US)

(73) Assignee: GM Global Technology Operations LLC, Detroit, MI (US)

(*) Notice: Subject to any disclaimer, the term of this patent is extended or adjusted under 35 U.S.C. 154(b) by 155 days.

(21) Appl. No.: 16/208,791

(22) Filed: Dec. 4, 2018

(65) Prior Publication Data
US 2020/0172105 A1    Jun. 4, 2020

(51) Int. Cl.
| | | |
|---|---|---|
| *B60W 30/18* | (2012.01) | |
| *G08G 1/16* | (2006.01) | |
| *G08G 1/00* | (2006.01) | |
| *G05D 1/00* | (2006.01) | |

(52) U.S. Cl.
CPC ..... *B60W 30/18163* (2013.01); *G05D 1/0088* (2013.01); *G08G 1/167* (2013.01); *B60W 2554/801* (2020.02); *B60W 2720/10* (2013.01); *G05D 2201/0213* (2013.01)

(58) Field of Classification Search
CPC ..... B60W 30/18163; B60W 2554/801; B60W 2720/10; B60W 2554/804; B60W 2554/802; B60W 2552/53; B60W 60/001; B60W 30/09; B60W 40/04; G08G 1/167; G05D 1/0088; G05D 2201/0213
USPC .......................................................... 701/70
See application file for complete search history.

(56) References Cited

U.S. PATENT DOCUMENTS

| | | | |
|---|---|---|---|
| 2013/0184926 A1* | 7/2013 | Spero | B60W 30/18163 701/26 |
| 2015/0057907 A1* | 2/2015 | Rebhan | B60W 50/0097 701/93 |
| 2015/0251656 A1* | 9/2015 | Yester | B60W 10/20 701/41 |
| 2017/0242435 A1* | 8/2017 | Nilsson | G08G 1/167 |
| 2018/0046191 A1* | 2/2018 | Keller | B60W 30/18163 |
| 2019/0172355 A1* | 6/2019 | Stock | B60W 30/14 |

* cited by examiner

*Primary Examiner* — Brian P Sweeney
(74) *Attorney, Agent, or Firm* — Lorenz & Kopf, LLP

(57) ABSTRACT

The present application generally relates to a method and apparatus for lane changes performed by an assisted driving control system in a motor vehicle. In particular, the system is operative to determine a requirement for a lane change, to determine a first headway between a host vehicle and a lead vehicle and a second headway between the host vehicle and an adjacent vehicle occupying the desired lane. The velocity of the host vehicle is adjusted in response to the first headway and the second headway and the lane change is initiated in response to the second headway exceeding an adequate distance.

20 Claims, 4 Drawing Sheets

200

APPARATUS AND METHOD FOR LONGITUDINAL CONTROL IN AUTOMATIC LANE CHANGE IN AN ASSISTED DRIVING VEHICLE

BACKGROUND

The present disclosure relates generally to operation of autonomous vehicle and driver confirmation of optional maneuvers. More specifically, aspects of the present disclosure relate to systems, methods and devices for determining an optional maneuver during operation of an autonomous vehicle and headways using relative velocities of surrounding vehicles to determine merge and lane change maneuvers.

Autonomous vehicles operate with various levels of autonomy, generally characterized by five levels, such as level one having the least autonomy, such as adaptive cruise control, to level five having complete autonomy. During operation it may be desirable for a vehicle to change lanes during operations. This may include merging into a lane when entering a controlled access motorway or the like. If a desired lane is occupied an autonomous vehicle control system must determine the best method to enter the lane in light of the vehicle occupying the lane in the most efficient manner possible. It would be desirable to enable an autonomous vehicle control system to make these decisions in a convenient manner.

The above information disclosed in this background section is only for enhancement of understanding of the background of the invention and therefore it may contain information that does not form the prior art that is already known in this country to a person of ordinary skill in the art.

SUMMARY

Disclosed herein are vehicle braking methods and systems and related control logic for provisioning vehicle steering, propulsion, and braking control systems, methods for making and methods for operating such systems, and motor vehicles equipped with onboard control systems. By way of example, and not limitation, there is presented various embodiments of determining proximate obstacles in a roadway and changing lanes in avoidance of these obstacles for an automated vehicle control system are disclosed herein.

In accordance with an aspect of the present invention a method comprising determining a first headway between a host vehicle and a lead vehicle wherein the host vehicle and the lead vehicle are travelling in a first lane, determining a second headway between the host vehicle and a proximate vehicle wherein the proximate vehicle is travelling in an adjacent lane to the first lane, receiving a request to move the host vehicle into the adjacent lane, adjusting a first velocity of the host vehicle in response to the first headway and the second headway, determining a third headway between the host vehicle and a proximate vehicle, and steering the host vehicle from the first lane to the adjacent lane in response to the third headway exceeding a threshold.

In accordance with another aspect of the present invention, an apparatus comprising a sensor for determining a first headway between a lead vehicle and a host vehicle and for determining a second headway between a proximate vehicle and the host vehicle, a processor for receiving a request for a lane change, for generating a first control signal for adjusting a first velocity of the host vehicle in response to the first headway and the second headway, and for generating a second control signal for initiating the lane change, and a controller for adjusting the first velocity in response to the first control signal and steering the host vehicle into an adjacent lane in response to the second control signal.

In accordance with another aspect of the present invention a vehicle control system comprising a sensor for determining a first distance between a lead vehicle and a host vehicle and a first velocity of the lead vehicle and a second distance between a proximate vehicle and a host vehicle and a second velocity of the proximate vehicle, a vehicle controller for controlling a host velocity of the host vehicle in response to a first control signal and a direction of the host vehicle in response to a second control signal, and a processor for generating the control in response to a request for a lane change in response to the first distance and first velocity and the second control signal in response to the second distance and the second velocity The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
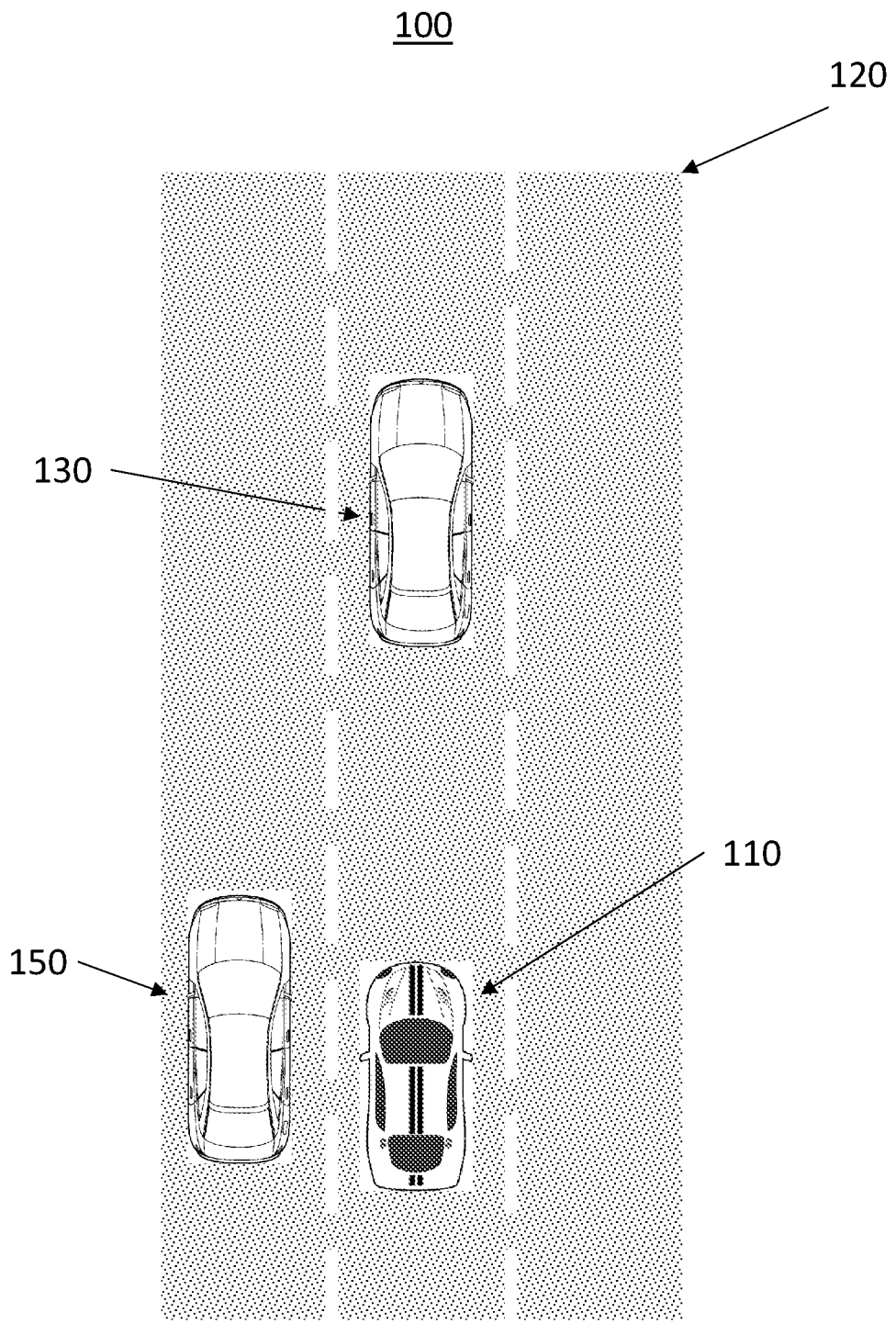
FIG. 1 schematically illustrates an exemplary application of the method and apparatus for longitudinal control in automatic lane change in an assisted driving vehicle according to an exemplary embodiment.

The exemplifications set out herein illustrate preferred embodiments of the invention, and such exemplifications are not to be construed as limiting the scope of the invention in any manner.

DETAILED DESCRIPTION

The following detailed description is merely exemplary in nature and is not intended to limit the disclosure or the application and uses thereof. Furthermore, there is no intention to be bound by any theory presented in the preceding background or the following detail description.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIG. 1 schematically illustrates and exemplary application of the method and apparatus for longitudinal control in automatic lane change in an assisted driving vehicle 100 according to the present disclosure. In this exemplary embodiment, an assisted driving control system controlling a host vehicle is employed to navigate a route including a three-land unidirectional roadway 120. At the situation depicted in FIG. 1, if the host vehicle is traveling at a velocity greater than a lead vehicle 130 immediately ahead of the host vehicle 110 in the center lane, the assisted driving control system controlling the host vehicle 110 may decide to change lanes to the left, to the uppermost depicted lane on the roadway 120 in order to pass the lead vehicle 130. However, if these is a third vehicle 150 in the desired lane the assisted driving control system in the host vehicle 110 must then determine whether to speed up or slow down in order to move into the desired lane in a safe manner while avoiding the third vehicle 150.

The exemplary system and method for longitudinal control in automatic lane change in an assisted driving vehicle is operative to use the headway of the host vehicle 110 to the third vehicle 150 in conjunction with the headway to a lead vehicle 130 to adjust the relative location of the host vehicle 110 so that a merge or lane change to a position behind or in front of the third vehicle 150 can be achieved. Headway may include speed and relative position between vehicles. Based on the desired direction of the lane change or merge, the method is operative to determine an appropriate gap in traffic by selecting an appropriate actor for the lane change or merge maneuver. In an exemplary embodiment, the method may then be operative to adjust the host vehicle 110 headway to the third vehicle 150 in conjunction with the host headway to any lead vehicle 130 that may be present to allow the lane change or merge to occur.

Figure 2:
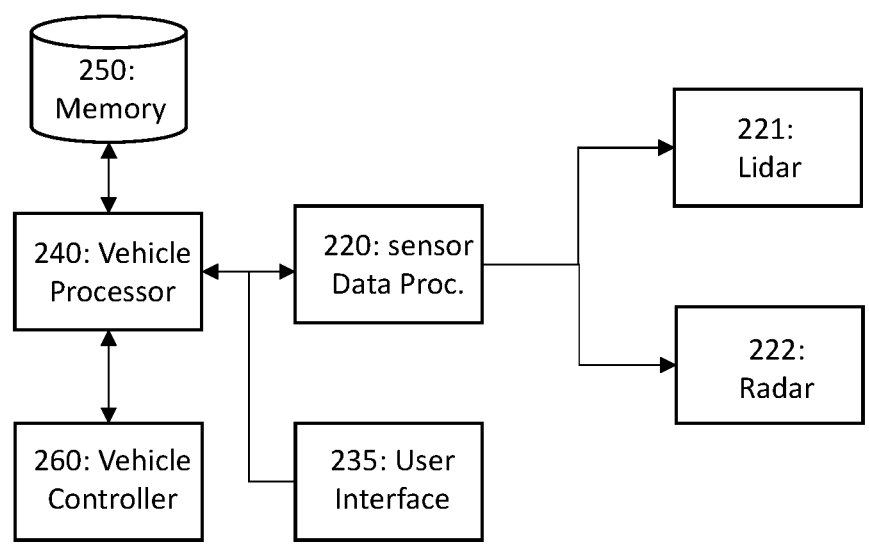
FIG. 2 shows a block diagram illustrating an exemplary system for longitudinal control in automatic lane change in an assisted driving vehicle according to an exemplary embodiment.

Turning now to FIG. 2, a block diagram illustrating an exemplary system for longitudinal control in automatic lane change in an assisted driving vehicle 200 is shown. The exemplary system may have a lidar 221, a radar 222, a sensor data processor 220, a vehicle processor 240, a vehicle controller 260, a memory 250 and a user interface 235. In an exemplary application, an instance where a lane change is desired by the assisted driving control system and wherein vehicles are proximate to the host vehicle. The system is operative to adjust the velocity of the host vehicle in response to a headway of a lead vehicle and a proximate vehicle in the desired lane.

In this exemplary embodiment, the lidar 221 and radar 222 sensors may be used to sense the location and trajectory of proximate vehicles surrounding the assisted driving vehicle. This information may be used to determine the headway and time to collision (TTC) to each of the proximate vehicles. The sensor data processor 220 may be operative to receive the data from the lidar 221 sensor and the radar 222 sensor and to convert this data into usable location information. The sensor data processor 220 may be operative to generate a three dimensional map of the areas proximate to the host vehicle indicative of other vehicles, obstacles and other objects. The vehicle processor 240 may use this three dimensional map and an input to the assisted driving control algorithm.

The vehicle processor 240 is operative to perform the exemplary methods for longitudinal control in automatic lane change as well as other assisted driving algorithms in response to the three dimensional map generated by the sensor data processor 220. The vehicle processor 240 is then operative to generate control signals for coupling to the vehicle controller 260. The vehicle controller 260 is operative to generate control signals for coupling to the various vehicle control systems, such as steering, speed control, braking and the like. The memory may be operative to store map data, drivers, control data and other data for used by the sensor data processor 220, the vehicle processor 240, the vehicle controller 260 and/or other vehicular systems. The user interface 235 is used to receive instructions from a vehicle occupant or vehicle driver, such as a driver request for a lane change. The user interface 235 may include a push button, lever, touch screen interface, voice recognition device or the like and is used to receive commands from a vehicle occupant as input to the vehicle controller. In an exemplary embodiment, the input may include a request for a lane change or a requested to remain in the current lane.

Figure 3:
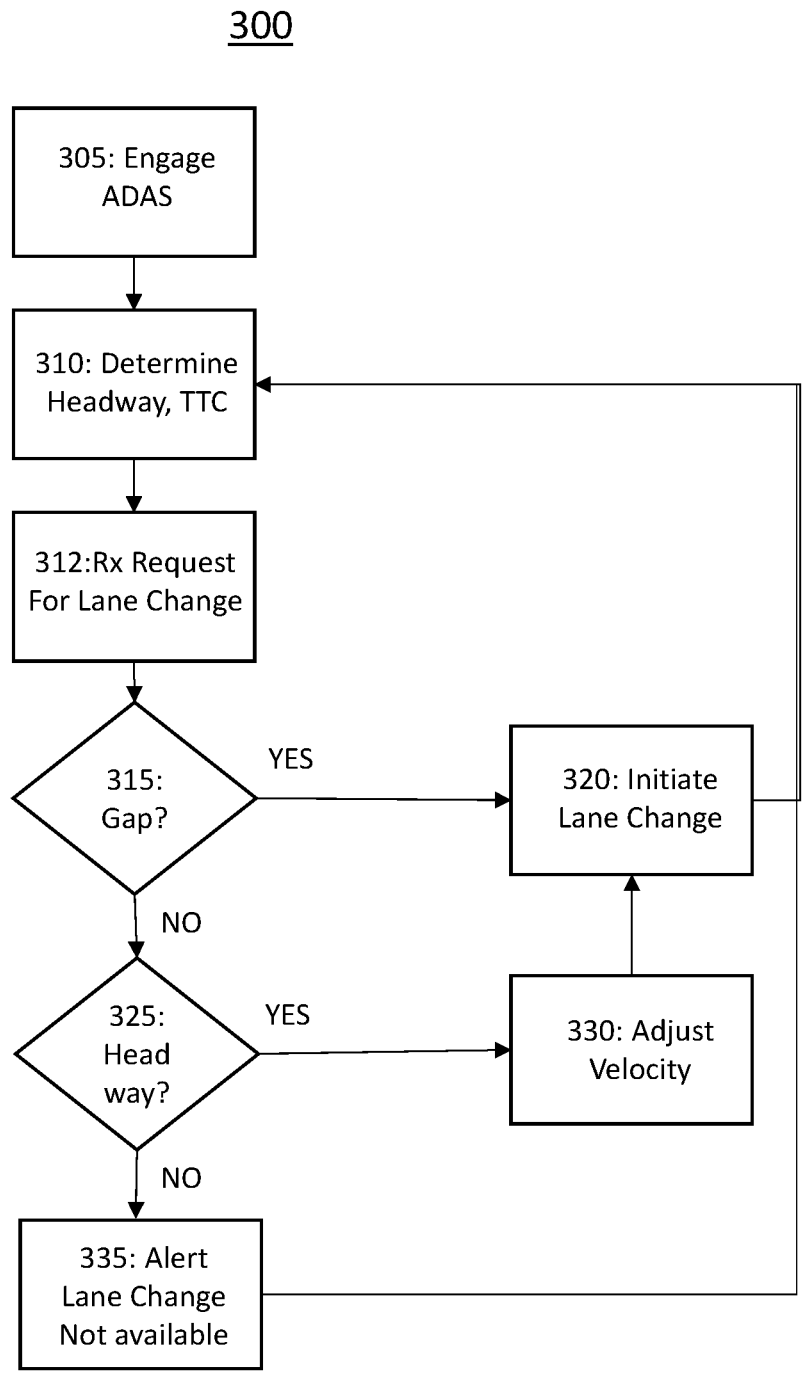
FIG. 3 shows a flowchart illustrating an exemplary method for longitudinal control in automatic lane change in an assisted driving vehicle according to an exemplary embodiment.

Turning now to FIG. 3, a flowchart illustrating an exemplary method for longitudinal control in automatic lane change in an assisted driving vehicle 300 is shown. In this exemplary embodiment, the method is operative to determine a lane change location. The method is first operative to engage an assisted driving algorithm 305. The assisted driving algorithm may include a driving assistance feature, such as adaptive cruise control, lane centering, or autonomous vehicle operation.

Once the vehicle has engaged the assisted driving algorithm, the system is continuously operative to monitor the environment proximate to the vehicle including stationary and moving objections, as well as lane markers, road surfaces, etc. As part of the environment monitoring, the method is operative to determine a headway and/or a time to collision TTC for each proximate vehicle 310. The headway is a measurement of the time or distance between vehicles. Thus, the method is operative to determine a headway and TTC for each of the proximate vehicles in the roadway. The headways and TTCs are continuously updated during operation to when monitoring the position of the vehicle in relation to the proximate vehicles.

During assisted driving operation, the method may generate or receive a request for a lane change 312. The lane change may be requested in response to a TTC or headway between the host vehicle and a vehicle in the lane in front of the host vehicle falling below an operational threshold. In response to the operational threshold, the method may determine that at the current velocity the host vehicle will may collide with the leading vehicle. The method may then determine if a lane change is possible in order to avoid reducing velocity to match that of the leading vehicle. In addition, the lane change may be requested by a vehicle occupant or driver, possibly in response to road conditions or the like.

In order to determine if a lane change is possible, the method must first determine if there is an appropriate gap in the destination lane 315. If yes, the method then initiates the lane change 320. If there is not a sufficient gap in the destination lane to permit a lane change due to an occupying vehicle, the method is then operative to determine if there is sufficient headway before or after the occupying vehicle in the destination lane 325. The method may optionally adjust the front and rear gap sizes based on environment such as rain or snow. If it is determined that there is sufficient headway before or after the occupying vehicle, the method is operative to adjust the host vehicle velocity and initiate the lane change 330 while avoiding the occupying vehicle. If there is not sufficient headway before or after the occupying vehicle, the method may determine that a lane change to the destination lane is not possible. The method may optionally generate an alert to vehicle occupant that vehicle is unable to perform lane change 335 or may look to a different destination lane for performing the lane change. The method is then operative to return to calculating headway for proximate vehicles 310.

Figure 4:
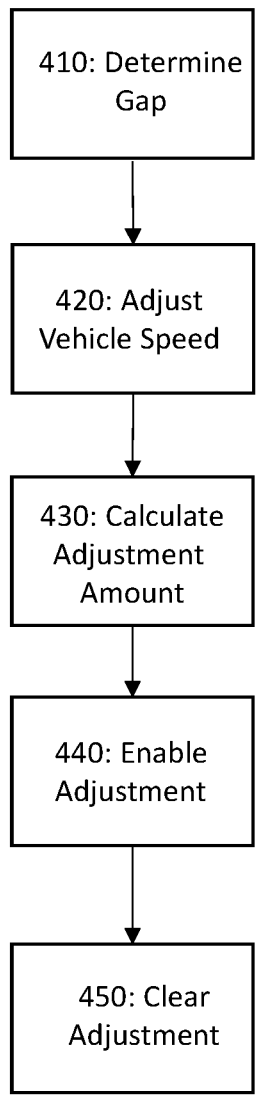
FIG. 4 shows a flowchart illustrating another exemplary method longitudinal control in automatic lane change in an assisted driving vehicle according to an exemplary embodiment.

Turning now to FIG. 4, a flowchart illustrating an exemplary method for longitudinal control in automatic lane change in an assisted driving vehicle 400 is shown. The exemplary method is operative to determine an adjustment to the host vehicle position in response to a gap not being directly available in the destination lane, but a gap either in front or behind the occupying vehicle being large enough.

The method is first operative to determine that a gap is available for at least one of the front or rear of an occupying vehicle in the destination lane 410. The method is then operative to determine if a host vehicle adjustment should be made in the forward direction or the rearward direction 420. This determination may be made in response to the position of the occupying vehicle, velocity of the occupying vehicle, position of the leading vehicle in the current lane, headway to additional proximate vehicles or the like.

The method is then operational to calculate an adjustment amount 430, such as headway adjustment, host velocity adjustment, and/or acceleration. Headway adjustment may be determined in response to the current front headway minus the front headway for a lane change plus the current rear headway minus the rear headway for a lane change. The host velocity is the velocity of the host vehicle within the intended lane. The host acceleration is a calibration based on speed of host and headway adjustment. The method may then enable the adjustment and send request to longitudinal controller 440. The adjustment may be indicative of the occupying vehicle in the destination lane and the current lead vehicle. Once the lane change is complete, the method is operative to clear the adjustment 450. If the lane change operation is active too long, the method may be operative to clear the adjustment and indicate the lane change is not possible. If the lane change is still needed, try to find a new gap.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term. "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling a host vehicle comprising:
   determining, by a sensor data processor, a first headway between the host vehicle and a lead vehicle wherein the host vehicle and the lead vehicle are travelling in a first lane;
   determining, by the sensor data processor, a second headway between the host vehicle and a proximate vehicle wherein the proximate vehicle is travelling in an adjacent lane to the first lane;
   receiving a request, by a vehicle processor from an assisted driving algorithm, to move the host vehicle into the adjacent lane;
   adjusting by the vehicle processor, a first velocity of the host vehicle in response to the first headway and the second headway;
   determining, by the sensor data processor, a third headway between the host vehicle and a proximate vehicle; and
   steering the host vehicle, by the vehicle processor, from the first lane to the adjacent lane in response to the third headway exceeding a threshold.

2. The method of claim 1 wherein the threshold is indicative of a gap within the adjacent lane to accommodate the host vehicle.

3. The method of claim 1 further comprising determining a second velocity of the proximate vehicle and wherein the adjustment of the first velocity is further made in response to the second velocity.

4. The method of claim 1 further comprising determining a second velocity of the proximate vehicle and wherein the first velocity is reduced in response to the second velocity exceeding the first velocity.

5. The method of claim 1 further comprising determining a second velocity of the proximate vehicle and wherein the velocity is increased in response to the first velocity exceeding the second velocity.

6. The method of claim 1 wherein the adjusting the first velocity is made in response to a request from a host vehicle occupant.

7. The method of claim 1 wherein the adjusting the first velocity is made in response to the first headway being less than a predetermined distance.

8. The method of claim 1 wherein the adjusting the first velocity is made in response to the first headway being less than a predetermined distance and the first velocity exceeding a lead vehicle velocity.

9. An apparatus for controlling a host vehicle comprising:
   a sensor for determining a first headway between a lead vehicle and the host vehicle and for determining a second headway between a proximate vehicle and the host vehicle;
   a processor for initiating a lane change operation in response to the first headway falling below an operational threshold for generating a first control signal for adjusting a first velocity of the host vehicle in response to the initiation of the lane change operation, the first headway and the second headway, and for generating a second control signal for initiating the lane change; and
   a controller for adjusting the first velocity in response to the first control signal and steering the host vehicle into an adjacent lane in response to the second control signal.

10. The apparatus of claim 9 wherein the second control signal is generated in response to a gap within the adjacent lane great enough to accommodate the host vehicle.

11. The apparatus of claim 9 further comprising determining a second velocity of the proximate vehicle and wherein the adjustment of the first velocity is further made in response to the second velocity.

12. The apparatus of claim 9 further comprising determining a second velocity of the proximate vehicle and wherein the first velocity is reduced in response to the second velocity exceeding the first velocity.

13. The apparatus of claim 9 further comprising determining a second velocity of the proximate vehicle and wherein the velocity is increased in response to the first velocity exceeding the second velocity.

14. The apparatus of claim 9 wherein the adjusting the first velocity is made in response to a request from a host vehicle occupant.

15. The apparatus of claim 9 wherein the adjusting the first velocity is made in response to the first headway being less than a predetermined distance.

16. The apparatus of claim 9 wherein the adjusting the first velocity is made in response to the first headway being less than a predetermined distance and the first velocity exceeding a lead vehicle velocity.

17. A vehicle control system for controlling a host vehicle comprising:
- a sensor data processor for determining a first distance between a lead vehicle and the host vehicle and a first velocity of the lead vehicle and a second distance between a proximate vehicle and a host vehicle and a second velocity of the proximate vehicle;
- a vehicle controller for controlling a host velocity of the host vehicle in response to a first control signal from a vehicle processor, and a direction of the host vehicle in response to a second control signal from the vehicle processor; and
- the vehicle processor for generating the first control signal in response to a request for a lane change from an assisted driving algorithm, in response to the first distance and first velocity and the second control signal in response to the second distance and the second velocity.

18. The vehicle control system of claim 17 wherein the second distance and the second velocity are indicative of a gap sufficient in a desired lane to accommodate the host vehicle.

19. The vehicle control system of claim 17 wherein the host velocity is reduced in response to the second velocity exceeding the host velocity.

20. The vehicle control system of claim 17 wherein the host velocity is increased in response to the host velocity exceeding the second velocity.

* * * * *